Figure 1:
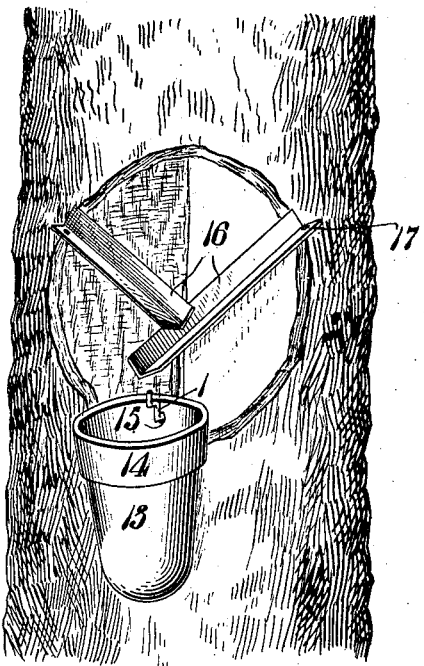

No. 857,823. PATENTED JUNE 25, 1907.
T. A. McGREGOR.
SAP CUP HOOK.
APPLICATION FILED MAR. 5, 1907.

WITNESSES:

Thomas A. McGregor,
INVENTOR

By C. A. Snow & Co.
ATTORNEYS

UNITED STATES PATENT OFFICE.

THOMAS ALONZO McGREGOR, OF HALCYONDALE, GEORGIA.

SAP-CUP HOOK.

No. 857,823.     Specification of Letters Patent.     Patented June 25, 1907.

Application filed March 5, 1907. Serial No. 360,657.

*To all whom it may concern:*

Be it known that I, THOMAS ALONZO MC-GREGOR, a citizen of the United States, residing at Halcyondale, in the county of Screven and State of Georgia, have invented a new and useful Sap-Cup Hook, of which the following is a specification.

This invention relates to a hook of peculiar form to be driven into a tree and from which is suspended a cup or other receptacle for gathering sap exuding from a cut made in the tree.

In orcharding turpentine by the Herty method, a cup of peculiar form is used for collecting the sap as it flows from the tree. These cups are made of earthenware and metal, about seven inches high, five and one-half inches diameter at the top and three inches at the bottom. The metal cups are expensive, and the operators for this reason would doubtlessly prefer the earthenware cup if some means were devised for protecting them from breakage. Around the top is a rim two inches in depth through which a hole is made about one-half inch in diameter and from one-half to three-quarters of an inch from the top of the rim. The thickness of the side walls of the earthenware cup is one-fourth of an inch, while the bottom of the cups are oval or semi-circular, in vertical section, on the inside. After a tree has been cut or chipped for the outflow of sap, a nail is driven in the tree at a suitable place and at a sharp downward angle leaving only about three-fourths of an inch exposed. On this nail the Herty cup is hung; the inclination of the nail is intended to prevent the cup from falling off or being easily knocked off, but which, as a matter of fact, it does not always do. Gutters, usually made of galvanized iron, are fastened to the scarified portion of the tree and incline downwardly toward the cup to carry the sap thereinto.

At the end of the chipping season and before scraping, it is necessary to remove the cups, gutters and nails which are laid on the ground and remain there until the next harvest. Great loss of equipment is experienced by thus leaving it on the ground, the cups are broken and the gutters become disfigured, rusted and lost. During the winter, water enters the cups and freezing, burst them; stock and other animals traveling through the woods trample on the cups and gutters and destroy a great number; while others are destroyed by fire put into the woods in winter by operators for preventing the woods becoming too rough. Because of this extensive destruction of equipment, harvesting by the Herty method is made relatively quite expensive, and were it not for the excellent results obtained the method would have been abandoned.

For the purposes of saving the losses above enumerated and to improve the method of harvesting so that the cheap earthenware cups may be used in the cold upper regions of the pine belt, the device hereinafter described has been devised, the object of which is to provide a hook of peculiar shape, on a certain portion of which the Herty cup is suspended in correct position when gathering sap, and which, after the harvest has been gathered, affords an excellent support for the gutters and upholds the cup in such a way that it is impossible for water to enter or collect therein. For thus storing the equipment during winter the hooks are placed sufficiently high above the ground as to be out of the way of animals and fire.

Another advantage which may be mentioned in favor of the improved hook, arises from the objections made by lumbermen and saw mill owners to the use of nails from the fact that workmen are not careful to extract all the nails driven in the trees; overlooking some because not seen and in other cases, the heads pull off and the nails are permitted to remain. These overlooked nails, when the trees are cut into lumber, come in contact with the saws and ruin them. When the hook is used it is of such size and shape as to be easily visible and readily extracted, as the wire of which it is made does not break when pulling out the hook.

Figure 2:
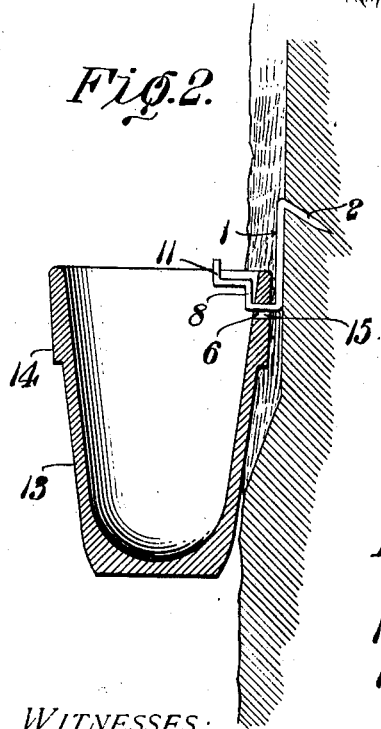
Figure 3:
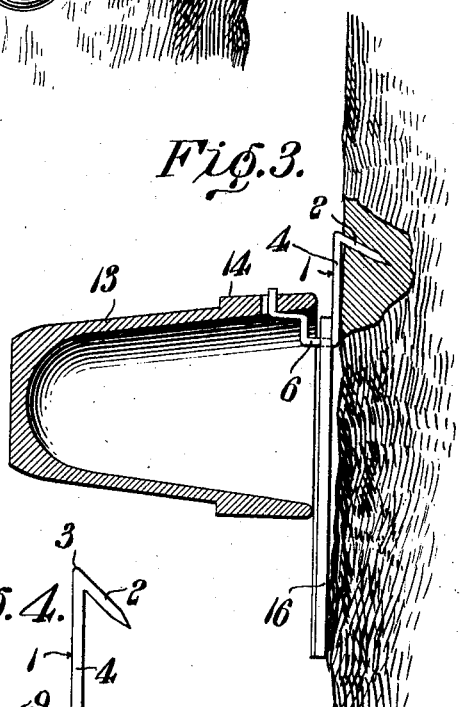
Figure 4:
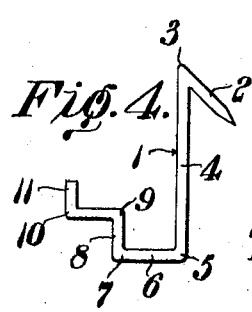

To more fully understand the invention attention is called to the following description and claims and the drawings accompanying the same, in which, Figure 1 is a view representing a portion of a tree equipped with the Herty cup and gutters, the cup supported by the improved hook. Fig. 2 is a vertical section through a Herty cup in gathering position suspended by the hook. Fig. 3 is a similar view illustrating the Herty cup and gutters stored for the winter, and Fig. 4 is a view of the hook detached.

Similar numerals of reference indicate corresponding parts in all of the figures of the drawings.

The hook 1 is made of a single piece of wire of such length, diameter and material as circumstances demand. It must be sufficiently stiff and rigid to withstand driving in a tree and holding a filled Herty cup. One end of the wire is pointed and a sufficient length, say three-fourths inch, forming a spur 2 is bent backward at 3 on the body 4 of the wire until the spur 2 assumes an angle of about forty degrees with the body part 4, which latter part is straight for about one and one-half inches. The wire is then bent at 5, perpendicular to the body part 4, to form what for convenience will be called the working hook 6, about one-half inch long. A second perpendicular bend of the wire on itself at 7 forms the connecting or retaining section 8, three-eighths inch more or less in length. Another right angled bend at 9 and one at 10 completes the article, the two latter bends forming the storing hook 11. The driving spur 2, body 4 and the hooks 6 and 11 lie in the same plane, the end 2 however is on one side of the body 4 and the hooks on the other.

In applying the device for collecting the gum during the chipping season, the pointed spur 2 of the hook 1 is driven into the tree at a suitable place, see Fig. 1, for the collection of sap from the gutters 16, the body portion 4 depending downwardly in a substantially vertical position, the hooks 6 and 11 extending outwardly as shown. The inclination of the pointed spur 2 tends to hold the hook 1 always in position and prevent it from falling out of the tree should it become loose, as the greater the weight suspended therefrom within certain limits the tighter will it retain its hold in the tree.

The Herty cup indicated by 13 is made of earthenware, tapering inwardly from top to bottom which latter is rounded on the inside. A flange 14 surrounds the top of the cup through which a hole 15 is made for the passage of the cup suspending means. When sap is to be collected, the cup 13 is hung on the working hook 6 as represented in Fig. 2, the hook passing through the hole 15, and being held in place on the hook by the retaining section 8. After the harvest, the gutters 16 are suspended from the working hook 6 by holes 17 and lie close to the tree, while the cup 13, turned on its side as in Fig. 3, is placed on the storing hook 11 by passing the latter through the hole 15 from within the cup. Should the hook 1, when harvesting, be too low on the tree for safety, it may be extracted and driven in the tree at a greater altitude. The cups, stored as above described cannot retain any water entering them, and as they are at too great a height to be disturbed by the other causes mentioned, they will remain safe throughout the winter.

The hook 1 may be made of malleable iron, or of metal cast, punched, stamped or wrought in any form. The use of the hook will increase the cost of the Herty system but little; in fact, when account is taken of the loss occasioned by broken cups and lost gutters, the actual cost of the season's outfit will be less when the hooks are used than with nails.

Having thus described the invention, what is claimed is:—

1. As an article of manufacture, a hook made of a piece of wire having a body portion, a spur angularly disposed thereto on one end and a double hook on the opposite end formed by successive bends of the wire.

2. As an article of manufacture, a hook comprising a body portion having at one end a pointed spur projecting from one end of said body at an angle less than a right angle and at its other end a double hook.

3. As an article of manufacture, a hook comprising a body portion having at one end a pointed spur and at its other end a succession of turns perpendicular to each other and forming two hooks.

4. As an article of manufacture, a hook comprising a body portion having at one end a pointed spur and at its other end a succession of turns perpendicular to each other and forming two hooks in different planes, said planes being at right angles to the plane of the body portion.

5. As an article of manufacture, a suspending hook comprising a body, having a pointed spur projecting from one end of said body at an angle less than ninety degrees, a hooked portion projecting perpendicularly from the opposite end of the body in the same plane as said spur, and a second hooked portion continuous with the first hooked portion and at a greater distance from the body portion.

In testimony that I claim the foregoing as my own, I have hereto affixed my signature in the presence of two witnesses.

THOMAS ALONZO McGREGOR.

Witnesses:
LAURA KENNEDY,
JAMES C. HUNTER.